(12) United States Patent
Usami

(10) Patent No.: US 11,325,297 B2
(45) Date of Patent: *May 10, 2022

(54) INJECTION MOLDING MOLD, AND INJECTION MOLDING METHOD FOR HOLLOW ARTICLE

(71) Applicant: NISSEI ASB MACHINE CO., LTD., Nagano (JP)

(72) Inventor: Masayuki Usami, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 155 days.

This patent is subject to a terminal disclaimer.

(21) Appl. No.: 16/628,400

(22) PCT Filed: Jun. 29, 2018

(86) PCT No.: PCT/JP2018/024958
§ 371 (c)(1),
(2) Date: Jan. 3, 2020

(87) PCT Pub. No.: WO2019/009219
PCT Pub. Date: Jan. 10, 2019

(65) Prior Publication Data
US 2020/0156304 A1 May 21, 2020

(30) Foreign Application Priority Data
Jul. 4, 2017 (JP) .............................. JP2017-131435

(51) Int. Cl.
*B29C 49/48* (2006.01)
*B29C 49/06* (2006.01)
*B29L 31/00* (2006.01)

(52) U.S. Cl.
CPC .............. *B29C 49/48* (2013.01); *B29C 49/06* (2013.01); *B29B 2911/14013* (2013.01); *B29B 2911/14453* (2013.01); *B29L 2031/712* (2013.01)

(58) Field of Classification Search
None
See application file for complete search history.

(56) References Cited

U.S. PATENT DOCUMENTS

2011/0100946 A1    5/2011   Perra
2017/0326767 A1   11/2017   Zeik et al.
2020/0238594 A1*  7/2020   Sato ..................... B65D 1/0246

FOREIGN PATENT DOCUMENTS

CN       104908237 A    9/2015
CN       109153199 A    1/2019
(Continued)

OTHER PUBLICATIONS

International Search Report (ISA 210) issued in International Bureau of WIPO Patent Application No. PCT/JP2018/024958, dated Aug. 28, 2018.

(Continued)

*Primary Examiner* — Monica A Huson
(74) *Attorney, Agent, or Firm* — Greenblum & Bernstein, P.L.C.

(57) ABSTRACT

An injection molding mold including a neck mold forming an outer surface of a neck portion of a hollow article, an injection cavity mold forming an outer surface of a body portion of the hollow article, and an injection core mold forming an inner surface of the hollow article, in which the injection core mold includes an outer core mold forming an inner surface of the neck portion including an inner screw portion and, while rotating along the inner screw portion, being movable along a rotation axis thereof, and an inner core mold forming an inner surface of the body portion of (Continued)

the hollow article having a smaller diameter than that of the neck portion and being linearly movable inside the outer core mold along the rotation axis.

5 Claims, 6 Drawing Sheets

(56) References Cited

FOREIGN PATENT DOCUMENTS

| | | |
|---|---|---|
| JP | 57-203512 | 12/1982 |
| JP | 5-32258 | 8/1993 |
| JP | 2011-518735 | 6/2011 |
| JP | 2012-206466 | 10/2012 |
| JP | 5161358 | 3/2013 |
| JP | 2013-082083 | 5/2013 |
| JP | 2017-100351 | 6/2017 |

OTHER PUBLICATIONS

Written Opinion (ISA 237) issued in International Bureau of WIPO Patent Application No. PCT/JP2018/024958, dated Aug. 28, 2018, along with an English translation thereof.
Office Action issued in corresponding Chinese Patent Application No. 201880044188.6 dated Feb. 26, 2021 and English translation thereof.

* cited by examiner (a)

(b)

INJECTION MOLDING MOLD, AND INJECTION MOLDING METHOD FOR HOLLOW ARTICLE

TECHNICAL FIELD

The present invention relates to an injection molding mold for injection-molding a hollow article having a screw portion (inner screw portion) on an inner surface (inner side) of a neck portion, and an injection molding method for a hollow article.

BACKGROUND ART

In related art, for example, many containers containing beverages have a screw portion (outer screw portion) on an outer surface (outer side) of a neck portion, and are closed by a cap attached to the outer side of the neck portion having the outer screw portion. Further, there are not only containers which include the outer screw portion, but also containers which include an inner screw portion on an inner surface of the neck portion and are closed by a cap mounted in the neck portion.

In addition to containers, some of various hollow articles having a space inside have an inner screw portion formed on an inner surface of a neck portion. Since the inner screw portion is a so-called undercut, when the hollow article having the inner screw portion is injection-molded, it is difficult to demold the hollow article from an injection core mold without deforming the inner screw portion.

In recent years, various methods have been devised for preventing an inner screw portion (undercut) from being deformed. Specifically, a so-called collapsible core mold is used, or an injection core mold is demolded from a neck portion of a preform (hollow article) so as not to deform the inner screw portion by rotating an injection core mold having a single structure (for example, see Patent Literatures 1 and 2).

By adopting such a method, the hollow article can be demolded from the injection core mold without deforming the inner screw portion.

CITATION LIST

Patent Literature

Patent Literature 1: JP-A-S57-203512
Patent Literature 2: Japanese Patent No. 5161358

SUMMARY OF INVENTION

Technical Problem

However, for example, since the collapsible core mold disclosed in Patent Literature 1 is a mold formed by a plurality of parts requiring high processing accuracy, there is a problem of high cost. In addition, since an advancing and retreating movement of the collapsible core mold in a radial direction is operated by an elastic member, there is also a problem that durability is low.

Meanwhile, the method of rotating the core mold having the single structure disclosed in Patent Literature 2 may be suitably implemented as long as it is a hollow article (preform) that is completely cooled and solidified. However, when the hollow article is injection-molded, since blow molding is performed after injection molding, the injection core mold may be demolded in a state of not being sufficiently solidified (softened state). When the injection core mold is demolded in such a state, the hollow article (particularly, the inner screw portion) may be deformed.

The present invention has been made in view of the above circumstances, and an object thereof is to provide an injection molding mold and an injection molding method for a hollow article which can successfully demold a hollow article from an injection core mold when injection-molding a hollow article having an inner screw portion.

Solution to Problem

One aspect of the present invention for solving the above problem is an injection molding mold for injection-molding a hollow article in which an inner screw portion is formed on an inner surface of a neck portion, the injection molding mold including: a neck mold forming an outer surface of the neck portion; an injection cavity mold forming an outer surface of a body portion of the hollow article; and an injection core mold forming an inner surface of the hollow article, in which the injection core mold includes: an outer core mold forming the inner surface of the neck portion including the inner screw portion and, while rotating along the inner screw portion, being movable along a rotation axis thereof; and an inner core mold forming an inner surface of the body portion of the hollow article having a smaller diameter than that of the neck portion and being linearly movable inside the outer core mold along the rotation axis.

Here, it is preferable that the inner core mold is provided so as to be slidable inside the outer core mold, and a sliding surface between the inner core mold and the outer core mold are located on an outer side of an inner surface of the injection cavity mold.

It is preferable that a space for forming a protruding portion protruding from a bottom surface of the neck portion of the hollow article toward an opening side of the neck portion of the hollow article by injection molding is formed between the inner core mold and the outer core mold.

Further, it is preferable that the outer core mold extends to an outside of a neck mold and is supported by a support member, a male screw portion screwed into a female screw portion formed to the support member is formed at a tip end portion of the outer core mold, and a pitch of the male screw portion is the same as a pitch of the inner screw portion.

Another aspect of the present invention is an injection molding method for a hollow article which uses the above-described injection molding mold, the injection molding mold including: a demolding step of, after filling a resin material into an injection space between the injection cavity mold and the injection core mold and injection-molding the hollow article, demolding the hollow article from the injection core mold and the injection cavity mold in a state where the neck portion is held by the neck mold, in which, in the demolding step, after the inner core mold is linearly moved to demold the hollow article from the inner core mold, the hollow article is demolded from the outer core mold by, while rotating the outer core mold along the inner screw portion, linearly moving the outer core mold along the rotation axis thereof.

Advantageous Effects of Invention

According to the present invention, when injection-molding a hollow article (for example, a preform) having an inner screw portion, the hollow article can be successfully demolded from an injection core mold.

DESCRIPTION OF EMBODIMENTS

Hereinafter, an embodiment of the present invention will be described in detail with reference to the drawings.

The present invention relates to an injection molding mold for injection-molding a hollow article having an inner screw portion, and an injection molding method for a hollow article. Here, the hollow article refers to an article having a space inside, and includes, for example, a cap that closes a container and a preform for blow-molding a container, in addition to a container that accommodates beverage or the like. The hollow article according to the present embodiment is a preform for blow-molding a container.

Figure 1:
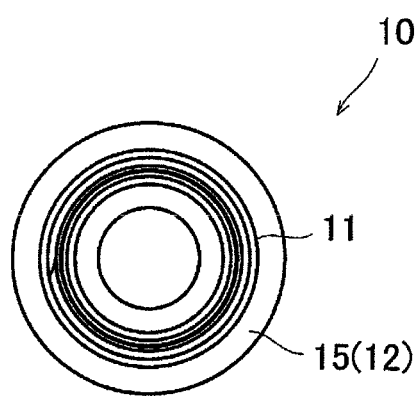
FIG. 1 is a top view and a cross-sectional view showing an example of a container that is a final product.
Figure 1:
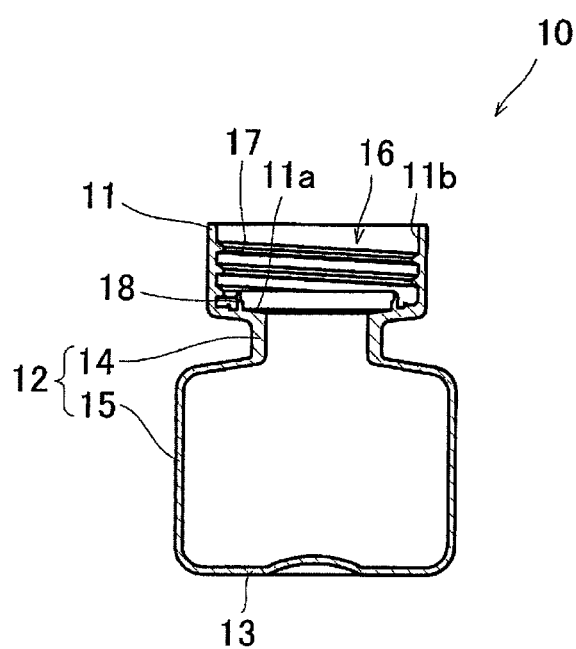
Figure 2:
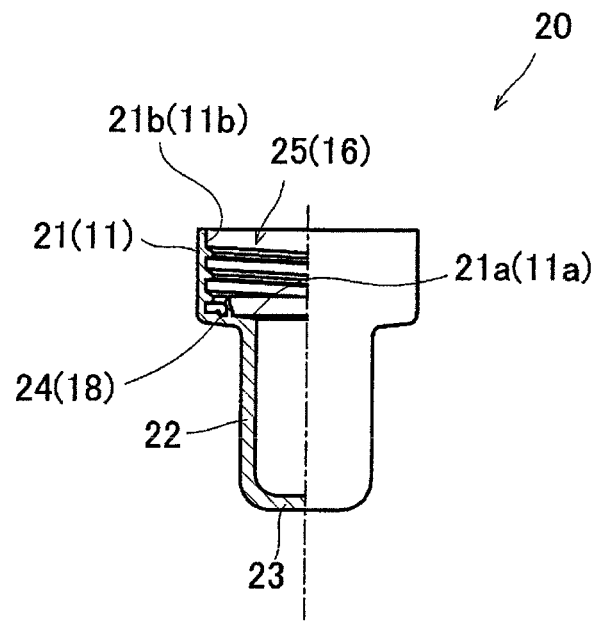
FIG. 2 is a side view showing an example of a preform which is a hollow article.

FIG. 1 is a view showing an example of a container according to an embodiment of the present invention, in which (a) is a top view, and (b) is a longitudinal sectional view. FIG. 2 is a side view of a preform which is a hollow article for blow-molding a container, and a part thereof is taken as a cross-section.

A container 10 shown in FIG. 1 is formed of, for example, a resin material such as polypropylene, and is formed to be hollow so as to be able to accommodate liquid or the like. The container 10 includes a cylindrical neck portion 11 having an opening at one end (upper end) side, a cylindrical body portion 12 continuous from the neck portion 11, and a bottom portion 13 continuous from the body portion 12. The body portion 12 includes a small-diameter portion 14 connected to a bottom surface 11a of the neck portion 11 and having a diameter smaller than that of the neck portion 11, and a body portion main body 15 having a diameter larger than that of the small-diameter portion 14. In the present embodiment, the body portion main body 15 is formed with a diameter larger than that of the neck portion 11. A size of the body portion main body 15 is not limited, and may be smaller than that of the neck portion 11.

An inner screw portion 16, which is a female screw, is formed on an inner peripheral surface 11b of the neck portion 11. That is, on the inner peripheral surface 11b of the neck portion 11, a screw thread (projection) 17 configuring the inner screw portion 16 is provided in a spiral shape protruding toward an inner side of the neck portion 11. Although not shown in the drawings, the neck portion 11 is mounted with a mounting member including an outer screw portion which is a male screw, so that the container 10 is closed.

A protruding portion 18 is formed on the bottom surface 11a of the neck portion 11. The protruding portion 18 protrudes from the bottom surface 11a of the neck portion 11 toward an opening side (upward in the drawing), and is continuously provided along a circumferential direction of the neck portion 11.

When a mounting member (not shown) is mounted to the neck portion 11, the protruding portion 18 comes into contact with the mounting member and functions as a seal material that closes a gap between the container 10. The protruding portion 18 is provided so as to protrude from the bottom surface 11a of the neck portion 11 in a curved shape (for example, a waveform) instead of a linear shape. A shape of the protruding portion 18 is not particularly limited, and may be any shape capable of exerting a function as a seal material.

The container 10 having such a shape is manufactured by blow-molding a body portion of a preform which is a hollow article formed by injection molding. As shown in FIG. 2, a preform 20 for blow-molding the container 10 includes a neck portion 21 that opens at one end (upper end) side, a body portion 22 that is continuous with the neck portion 21, and a bottom portion 23 that is continuous with the body portion 22.

The neck portion 21 of the preform 20 is a portion common to the neck portion 11 of the container 10 which is a final product, and has the same shape. That is, the neck portion 11 of the container 10 is substantially formed by injection molding. For example, in the present embodiment, a protruding portion 24 (18) is formed on a bottom surface 21a (11a) of the neck portion 21 (11) of the preform 20, and an inner screw portion 25 (16) is formed on an inner peripheral surface 21b (11b).

Figure 3:
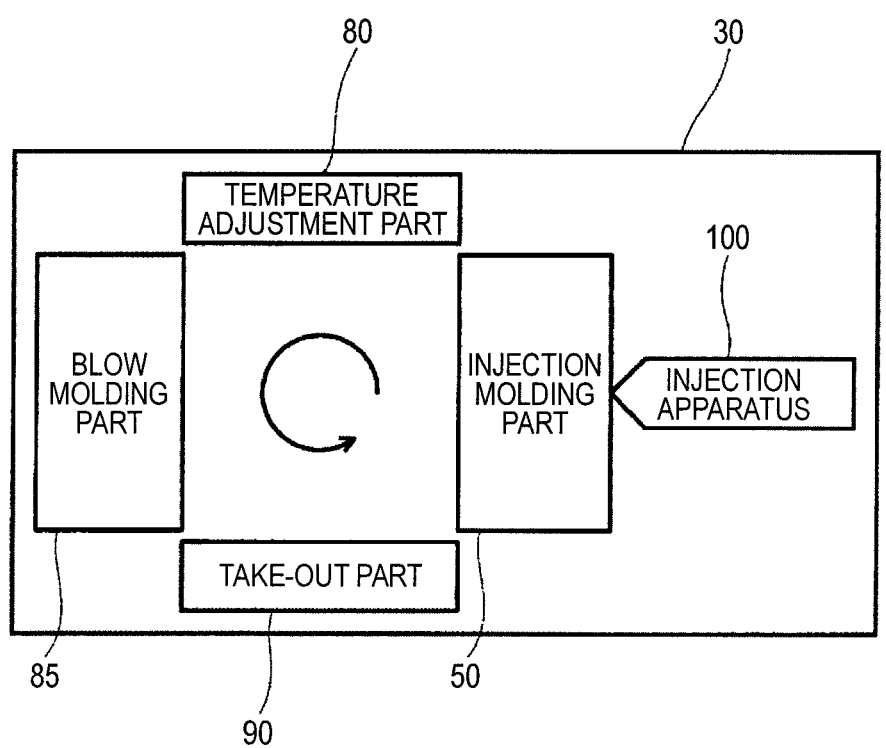
FIG. 3 is a block diagram showing an example of a schematic configuration of an injection blow molding apparatus.
Figure 4:
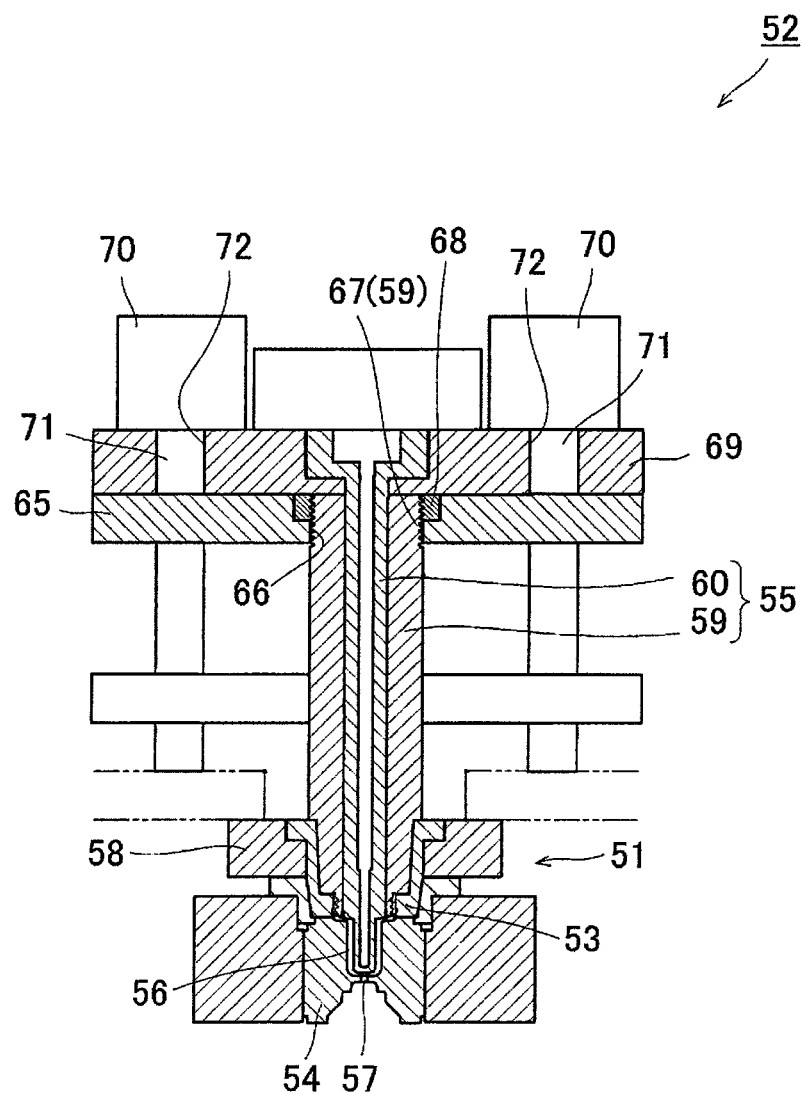
FIG. 4 is a cross-sectional view showing an injection molding mold apparatus according to the present invention.
Figure 5:
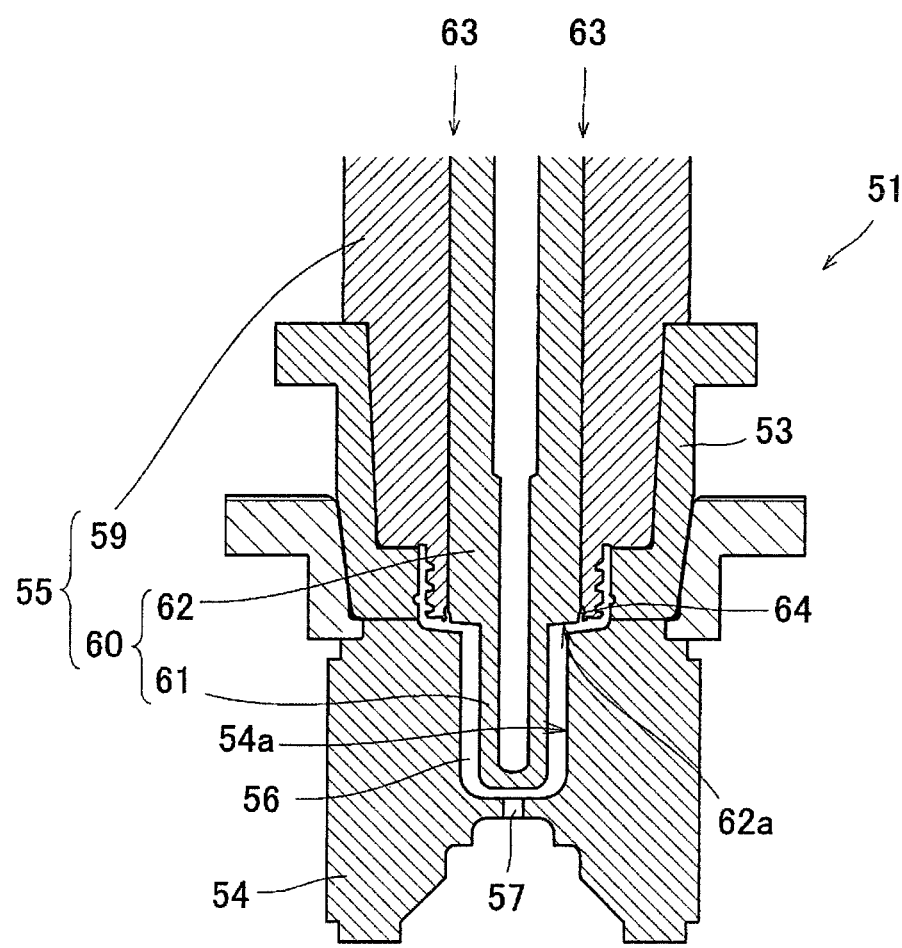
FIG. 5 is a cross-sectional view showing an example of an injection molding mold according to the present invention.

Next, an injection blow molding apparatus for molding the container 10 will be described. FIG. 3 is a block diagram showing an example of a schematic configuration of an injection molding apparatus according to the present embodiment. FIG. 4 is a cross-sectional view showing a schematic configuration of an injection molding mold apparatus. FIG. 5 is a cross-sectional view showing a schematic configuration of an injection molding mold.

As shown in FIG. 3, an injection blow molding apparatus 30 according to the present embodiment is a so-called one-stage injection blow molding apparatus, and includes, for example, an injection molding part 50, a temperature adjustment part 80, a blow molding part 85, and an take-out part 90. As shown in FIGS. 4 and 5, the injection molding part 50 includes an injection molding mold apparatus 52 including an injection molding mold 51 to which an injection apparatus 100 is connected, and forms the above-described preform 20 having a predetermined shape by injection molding.

The injection molding mold 51 includes a neck mold 53, an injection cavity mold 54, and an injection core mold 55. An injection space 56 is formed by the neck mold 53, the injection cavity mold 54, and the injection core mold 55. The preform 20 having the predetermined shape is formed in the injection space 56 by filling a resin material as a raw material via a gate 57 provided at the center of a bottom portion of the injection cavity mold 54. Since a configuration for injecting the resin material is an existing configuration, a description thereof is omitted here.

The neck mold 53 is formed of a pair of split molds and defines an outer surface of the neck portion 21 of the preform 20. The injection cavity mold 54 also defines outer surfaces of the body portion 22 and the bottom portion 23 of the preform 20. The neck mold 53 is fixed to a first elevating plate 58 configuring the injection molding mold apparatus 52. Although not shown, the first elevating plate 58 is configured to be movable upward and downward together with the neck mold 53.

The injection core mold 55 defines an inner surface of the preform 20. The injection core mold 55 according to the present invention includes an outer core mold 59 and an inner core mold 60. As will be described in detail below, since the injection core mold 55 includes the outer core mold 59 and the inner core mold 60 in this manner, the preform 20 can be successfully demolded from the injection core mold 55 when the preform 20 is injection-molded.

The outer core mold 59 is inserted inside the neck mold 53 to form an inner surface of the neck portion 21 of the preform 20 including the inner screw portion 25. More specifically, the outer core mold 59 forms a part (outer peripheral portion) of the bottom surface 21a of the neck portion 21 together with the inner peripheral surface 21b of the neck portion 21 provided with the inner screw portion 25 (see FIG. 2).

The inner core mold 60 forms an inner surface of the body portion 22 having a smaller diameter than that of the neck portion 21, and is provided in the outer core mold 59 so as to be linearly movable in a rotation axis direction of the outer core mold 59. Specifically, the inner core mold 60 includes a core portion 61 on a tip end (lower end) side and a sliding portion 62 that is continuous from the core portion 61. The core portion 61 is inserted into the injection cavity mold 54 to form an inner surface of the body portion 22 of the preform 20. The sliding portion 62 has a diameter larger than that of the core portion 61, and is slidably held in the outer core mold 59.

A sliding surface 63 between the outer core mold 59 and the inner core mold 60 are located on an outer side of an inner surface 54a of the injection cavity mold 54 (outer side of the inner surface of the body portion 22 of the preform 20). Therefore, the inner core mold 60 forms a part (central portion) of the bottom surface 21a of the neck portion 21 of the preform 20 together with the inner surface of the body portion 22 of the preform 20 having a smaller diameter than that of the neck portion 21.

That is, the inner surface of the body portion 22 of the preform 20 is formed by the core portion 61 of the inner core mold 60, and the inner surface (the bottom surface 21a and the inner peripheral surface 21b) of the neck portion 21 is formed by the outer core mold 59 and a tip end surface 62a of the sliding portion 62 of the inner core mold 60.

Here, since the body portion 22 of the preform 20 is stretched by blow molding in a subsequent step, the body portion 22 is formed to be thicker than the neck portion 21. Therefore, after injection molding, the body portion 22 of the preform 20 is softer than the neck portion 21. Therefore, the sliding surface 63 between the outer core mold 59 and the inner core mold 60 are located on the outer side of the body portion 22 of the preform 20. As a result, the preform 20 can be demolded from the injection core mold 55 more successfully.

Further, in the present embodiment, the sliding surface 63 between the outer core mold 59 and the inner core mold 60 is provided at a portion corresponding to the protruding portion 24. That is, a space 64 configuring a part of the injection space 56 and for forming the protruding portion 24 is formed between the outer core mold 59 and the inner core mold 60. Accordingly, the preform 20 can be successfully demolded from the injection core mold 55, and deformation of the protruding portion 24 at that time can be prevented.

Here, the outer core mold 59 is provided so as to be, while rotating along the inner screw portion 25 of the neck portion 21, linearly movable along the rotation axis thereof. That is, the outer core mold 59 is provided so as to be movable upward and downward while rotating along the inner screw portion 25 of the neck portion 21.

Specifically, the outer core mold 59 is extended to an outside (upper side) of the neck mold 53, and a vicinity of a tip end portion (upper end portion) thereof is supported by a support plate (support member) 65 configuring the injection molding mold apparatus 52. More specifically, a through hole 66 is formed in the support plate 65, and the tip end portion of the outer core mold 59 is inserted into the through hole 66 and is rotatably supported.

A male screw portion 67 is formed at an end portion (upper end portion) of the outer core mold 59 inserted into the through hole 66. Meanwhile, in a part of an inner surface of the through hole 66 of the support plate 65, which is an upper portion of the through hole 66 in the present embodiment, a female screw portion 68 into which the male screw portion 67 is screwed is provided. The male screw portion 67 and the female screw portion 68 are formed at the same pitch as a pitch of the inner screw portion 25 of the preform 20.

Although not shown in the drawings, the outer core mold 59 is connected to a driving unit such as a motor via a plurality of transmission members such as a plurality of gear members or belt members, and is configured to rotate with the driving unit as a power source. Of course, a configuration for rotating the outer core mold 59 is not limited.

A tip end portion (upper end portion) of the inner core mold 60 is fixed to a second elevating plate 69 configuring the injection molding mold apparatus 52. Actuator apparatuses 70 are fixed to the second elevating plate 69, and rod members 71 of the actuator apparatuses 70 are inserted into insertion holes 72 formed in the second elevating plate 69, and tip end portions (lower end portions) thereof are fixed to the support plate 65.

In the configuration of such an injection molding mold apparatus 52, the rod members 71 of the actuator apparatuses 70 advance (downward), so that the second elevating plate 69 is moved upward together with the actuator apparatuses 70. As the second elevating plate 69 is moved upward, the inner core mold 60 is moved upward. Meanwhile, since the rod members 71 are retracted (upward) from a state in which the inner core mold 60 is moved upward, the second elevating plate 69 is moved downward, and the inner core mold 60 is moved downward as the second elevating plate 69 is moved downward.

Next, referring to FIGS. 6 and 7, an injection molding method of a preform which is a hollow article, specifically, operation of an injection molding mold at the time of demolding of the preform will be described.

Figure 6:
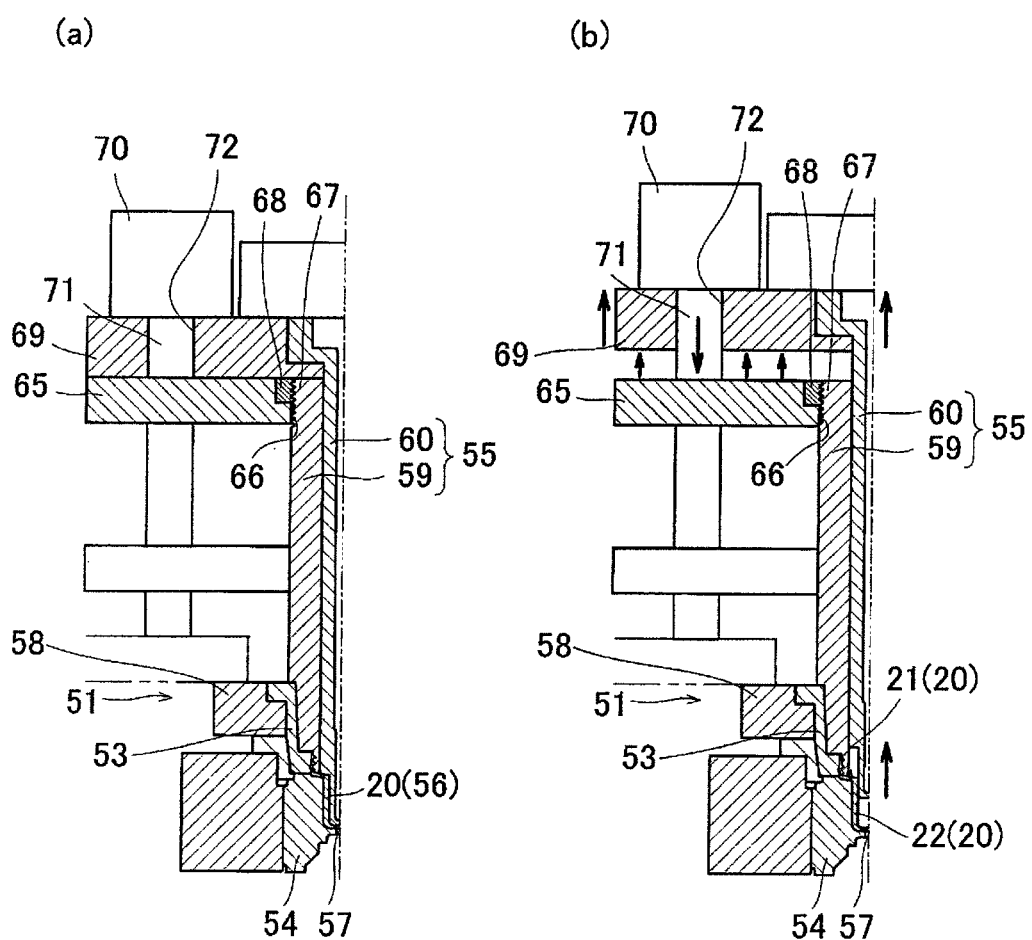
FIG. 6 is a cross-sectional view showing operation of the injection molding mold according to the present invention.

First, as shown in (a) of FIG. 6, in a state where the neck mold 53, the injection cavity mold 54, and the injection core mold 55 are clamped, the preform 20 having a predetermined shape is formed by filling the injection space 56 with the resin material through the gate 57 (an injection molding step). At this time, the second elevating plate 69 is in contact with the support plate 65, and upward movement of the inner core mold 60 is restricted.

When the preform 20 is cooled to a predetermined temperature, the injection core mold 55 is separated from the preform 20. That is, the preform 20 is demolded from the injection core mold 55. Specifically, as shown in (b) of FIG. 6, first, the second elevating plate 69 is moved upward to move the inner core mold 60 to the outside of the neck mold 53 (upward in the drawing). That is, by operating the actuator apparatus 70 to advance the rod member 71, the inner core mold 60 is moved upward together with the second elevating plate 69.

Accordingly, the inner core mold 60 can be separated from the preform 20 while the outer peripheral portion of the preform 20 is held by the outer core mold 59. As described above, the neck portion 21 of the preform 20 is thinner and is more easily cooled (more easily cured) than the body portion 22. Therefore, by moving the inner core mold 60 upward in a state in which the outer peripheral portion of the neck portion 21 in a cured state is held by the outer core mold 59, the inner core mold 60 can be successfully separated from the body portion 22 of the preform 20 (which is in a softened state with high holding heat).

Further, by moving the second elevating plate 69 upward, a gap is formed between the second elevating plate 69 and the support plate 65, so that the outer core mold 59 is in a state of being movable upward.

Figure 7:
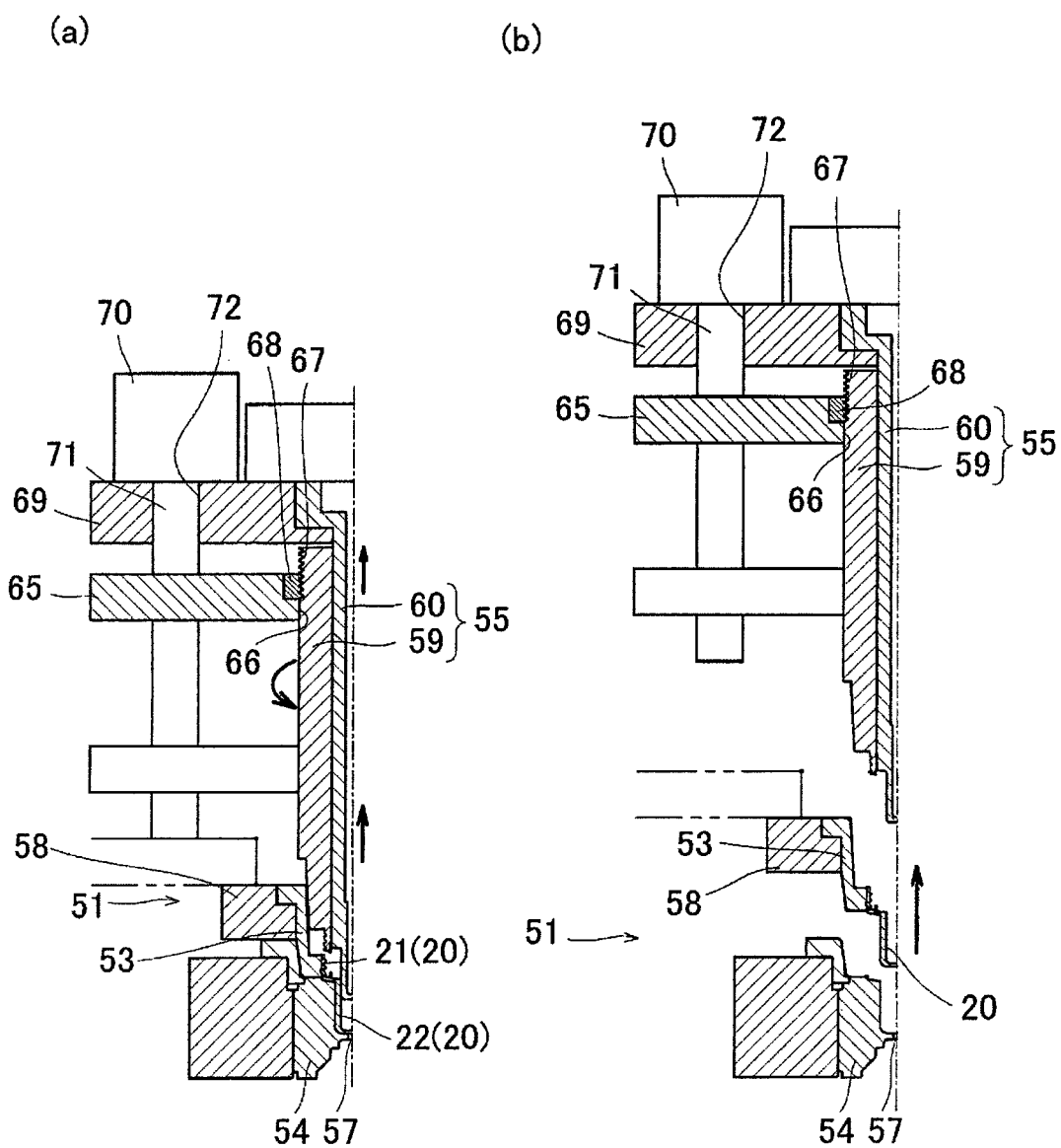
FIG. 7 is a cross-sectional view showing operation of the injection molding mold according to the present invention.

In this state, as shown in (a) of FIG. 7, the outer core mold 59 is moved toward the outside of the neck mold 53 while rotating. Specifically, the male screw portion 67 formed on the tip end portion (the upper end portion) of the outer core mold 59 is screwed into the female screw portion 68 provided in the support plate 65 to rotate.

Accordingly, the outer core mold 59 is moved (moved upward) toward the outside of the preform 20 while rotating along the inner screw portion 25 of the neck portion 21. Therefore, it is possible to successfully demold the preform 20 from the outer core mold 59 while preventing the deformation of the inner screw portion 25. That is, according to the injection molding mold 51 according to the present invention, the preform 20 can be successfully demolded from the injection core mold 55 while preventing deformation of the inner screw portion 25 when molding the preform 20 including the inner screw portion 25 being an undercut.

Next, as shown in (b) of FIG. 7, the neck mold 53 is moved upward by moving the first elevating plate 58 upward, and the body portion 22 of the preform 20 is demolded from the injection cavity mold 54. At this stage, since a surface (skin layer) of the body portion 22 of the preform 20 is sufficiently cured, the body portion 22 of the preform 20 can be successfully demolded from the injection cavity mold 54 by moving the neck mold 53 upward.

As described above, by using a method of demolding the injection core mold 55 in two stages with respect to the preform 20 including the inner screw portion 25 in the cured state and the body portion 22 in the softened state, that is, by using a method of demolding the preform 20 by independently operating two core molds (the outer core mold 59 and the inner core mold 60) corresponding to a curing part and a softening part, deformation of the preform 20 (in particular, the body portion 22) can be prevented and the preform 20 can be successfully demolded.

When the protruding portion 24 is provided to the neck portion 21, the inner core mold 60 is moved upward to a position that does not interfere with the protruding portion 24, that is, to a position above the protruding portion 24, and then demolding operation by the outer core mold 59 is performed.

The protruding portion 24 is sufficiently cured before the demolding of the inner core mold 60, and is in a state of being elastically deformable. Therefore, when the demolding operation by the outer core mold 59 is performed, by moving the inner core mold 60 upward to a position that does not interfere with the protruding portion 24, the protruding portion 24 is temporarily elastically deformed to an inner diameter side without any interference, following an upward movement accompanied by the rotation of the outer core mold 59. After the demolding operation of the outer core mold 59, the protruding portion 24 is restored to an original position where the injection molding is performed. Therefore, the preform 20 to which the protruding portion 24 is formed in the neck portion 21 can be successfully demolded.

Thereafter, while the neck portion 21 of the preform 20 is held by the neck mold 53, the preform 20 is conveyed from the injection molding part 50 to the temperature adjustment part 80 (see FIG. 3). In the temperature adjustment part 80, temperature of the body portion 22 of the preform 20 is adjusted to a temperature suitable for blow molding. Then, the preform 20 adjusted to a predetermined temperature is conveyed from the temperature adjustment part 80 to the blow molding part 85. In the blow molding part 85, the preform 20 is disposed in a blow molding mold, and the container 10 having a desired shape is formed by blow-molding the body portion 22 of the preform 20 (see FIG. 1). The blow-molded container 10 is conveyed from the blow molding part 85 to the take-out part 90 while being held by the neck mold 53. Then, in the take-out part 90, the container 10 is demolded from the neck mold 53 and is taken out to the outside of the injection blow molding apparatus 30.

As described above, since the neck portion 21 of the preform 20 has already been demolded from the injection core mold 55, in the take-out part 90, the container 10 can be taken out of the injection blow molding apparatus 30 by merely demolding the container 10 from the neck mold 53. That is, when the container 10 is taken out by the take-out part 90, the container 10 can be relatively easily demolded from the blow molding mold and taken out to the outside of the injection blow molding apparatus 30.

Although one embodiment of the present invention has been described above, the present invention is not limited to the above-described embodiment. The present invention can be appropriately modified without departing from the scope of the invention.

For example, although one preform is formed as an injection molding mold in the above-described embodiment, the injection molding mold may of course be configured such that a plurality of preforms can be formed at a time.

In the above-described embodiment, the injection blow molding apparatus includes the temperature adjustment part. However, the injection blow molding apparatus may be provided with a temperature adjustment part as necessary, and may not necessarily include a temperature adjustment part.

In the above-described embodiment, although the present invention is described by taking a preform for blow-molding a container as an example of a hollow article, the present invention can be applied to injection molding methods for various hollow articles. In other words, the use of the hollow article is not limited as long as it is formed by injection molding. Therefore, the present invention can be applied to, for example, an injection molding method of a container which is a final product or an injection molding method of a mounting member for closing a container.

REFERENCE SIGNS LIST 10 container
11 neck portion
11a bottom surface
11b inner peripheral surface
12 body portion
13 bottom portion 14 small-diameter portion
15 body portion main body
16 inner screw portion
17 screw thread (projection)
18 protruding portion
20 preform (hollow article)
21 neck portion
21a bottom surface
21b inner peripheral surface
22 body portion
23 bottom portion
24 protruding portion
25 inner screw portion
30 injection blow molding apparatus
50 injection molding part
51 injection molding mold
52 injection molding mold apparatus
53 neck mold
54 injection cavity mold
55 injection core mold
56 injection space
57 gate
58 first elevating plate
59 outer core mold
60 inner core mold
61 core portion
62 sliding portion
63 sliding surface
64 space
65 support plate
66 through hole
67 male screw portion
68 female screw portion
69 second elevating plate
70 actuator apparatus
71 rod member
72 insertion hole
80 temperature adjustment part
85 blow molding part
90 take-out part
100 injection apparatus

The invention claimed is:

1. An injection molding mold for injection-molding a hollow article in which an inner screw portion is formed on an inner surface of a neck portion, the injection molding mold comprising:
a neck mold forming an outer surface of the neck portion;
an injection cavity mold forming an outer surface of a body portion of the hollow article; and
an injection core mold forming an inner surface of the hollow article,
wherein the injection core mold includes:
an outer core mold forming the inner surface of the neck portion including the inner screw portion and, while rotating along the inner screw portion, being movable along a rotation axis thereof; and
an inner core mold forming an inner surface of the body portion of the hollow article having a smaller diameter than that of the neck portion and being linearly movable inside the outer core mold along the rotation axis.

2. The injection molding mold according to claim 1,
wherein the inner core mold is provided so as to be slidable inside the outer core mold, and a sliding surface between the inner core mold and the outer core mold are located on an outer side of an inner surface of the injection cavity mold.

3. The injection molding mold according to claim 2,
wherein a space for forming a protruding portion protruding from a bottom surface of the neck portion of the hollow article toward an opening side of the neck portion of the hollow article by injection molding is formed between the inner core mold and the outer core mold.

4. The injection molding mold according to claim 1,
wherein the outer core mold extends to an outside of a neck mold and is supported by a support member, a male screw portion screwed into a female screw portion formed to the support member is formed at a tip end portion of the outer core mold, and a pitch of the male screw portion is the same as a pitch of the inner screw portion.

5. An injection molding method for a hollow article which uses the injection molding mold according to claim 1, the injection molding method comprising:
after filling a resin material into an injection space between the injection cavity mold and the injection core mold and injection-molding the hollow article, demolding the hollow article from the injection core mold and the injection cavity mold in a state where the neck portion is held by the neck mold,
wherein, in the demolding,
after the inner core mold is linearly moved to demold the hollow article from the inner core mold, the hollow article is demolded from the outer core mold by, while rotating the outer core mold along the inner screw portion, linearly moving the outer core mold along the rotation axis thereof.

* * * * *